US010038997B2

(12) United States Patent
Kelly et al.

(10) Patent No.: US 10,038,997 B2
(45) Date of Patent: Jul. 31, 2018

(54) STORING PROFILE DATA IN DATA REPOSITORY LOCAL TO A REGIONAL SERVICE AREA

(71) Applicant: Hewlett Packard Enterprise Development LP, Houston, TX (US)

(72) Inventors: Michael R Kelly, Omaha, NE (US); Rob W Heldenbrand, Omaha, NE (US); Gary Iosbaker, Sigourney, IA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/337,616

(22) Filed: Oct. 28, 2016

(65) Prior Publication Data
US 2018/0124594 A1    May 3, 2018

(51) Int. Cl.
| H04W 4/00 | (2018.01) |
| H04W 8/20 | (2009.01) |
| H04L 29/08 | (2006.01) |
| H04W 4/021 | (2018.01) |
| H04W 8/04 | (2009.01) |
| G06F 17/30 | (2006.01) |
| H04W 12/06 | (2009.01) |
| H04W 12/08 | (2009.01) |

(52) U.S. Cl.
CPC ........ *H04W 8/20* (2013.01); *G06F 17/30312* (2013.01); *G06F 17/30386* (2013.01); *H04L 67/303* (2013.01); *H04W 4/021* (2013.01); *H04W 8/04* (2013.01); *H04W 12/06* (2013.01); *H04W 12/08* (2013.01)

(58) Field of Classification Search
CPC ......... H04W 8/20; H04W 4/021; H04W 8/04; H04W 12/08; H04W 12/06; H04L 67/303; G06F 17/30312; G06F 17/30386
USPC ....................................... 455/435.1; 370/338
See application file for complete search history.

(56) References Cited

U.S. PATENT DOCUMENTS

| 9,094,873 B2 | 7/2015 | Lu et al. | |
| 2003/0129991 A1* | 7/2003 | Allison | H04Q 3/0025 455/456.1 |
| 2004/0052224 A1* | 3/2004 | Arvidsson | H04W 8/12 370/329 |
| 2008/0189248 A1* | 8/2008 | Chung | G06F 17/30589 |

(Continued)

FOREIGN PATENT DOCUMENTS

WO    WO-2016119841    8/2016

OTHER PUBLICATIONS

Monserrat, J.F. et al., "Metis Research Advances Towards the 5G Mobile and Wireless System Definition", (Research Paper), EURASIP Journal on Wireless Communications and Networking, Mar. 10, 2015, 16 pages.

(Continued)

*Primary Examiner* — Marcos Batista
(74) *Attorney, Agent, or Firm* — Hewlett Packard Enterprise Patent Department

(57) ABSTRACT

Examples herein retrieve a profile data corresponding to a mobile device from a first data repository in response to the mobile device entering a regional service area. The examples store the profile data in a second data repository. The second data repository is local to the regional service area.

20 Claims, 6 Drawing Sheets

(56) References Cited

U.S. PATENT DOCUMENTS

2008/0253403 A1  10/2008  Bondy
2011/0143782 A1   6/2011  Dowlatkhah
2015/0373191 A1  12/2015  Shaw et al.

OTHER PUBLICATIONS

Talebifard, P. et al., "Simplified Wireless Connectivity for 5G Machine Type Communication", Ericsson Research, Montreal, Canada, Jul. 28, 2016, 6 pages.
Unknown, "5G Whitepaper: the Flat Distributed Cloud (FDC) 5G Architecture Revolution", 5G Innovation Centre, Institute for Communication Systems, University of Surrey Jan. 2016 26 pages.
Extended European Search Report, EP Application No. 17199077.3, dated Jan. 18, 2018, pp. 1-8, EPO.

\* cited by examiner

US 10,038,997 B2

STORING PROFILE DATA IN DATA REPOSITORY LOCAL TO A REGIONAL SERVICE AREA

BACKGROUND

Wireless communication networks have increased in popularity with the advent of wireless devices, such as smartphones, mobile devices, etc. Such wireless communication networks provide both data and voice communications. Accordingly, a subscriber may refer to a wireless device that has an account with a communication service provider (CSP). Each subscriber is associated with a profile definition that includes both transient data and static data. Transient data includes, by way of example, which domain and/or respective networking component the mobile device is attached to, time of attachment, etc. Static data includes, by way of example, charging characteristics, policies for network access, provided services, etc.

BRIEF DESCRIPTION OF THE DRAWINGS

In the accompanying drawings, like numerals refer to like components or blocks. The following detailed description references the drawings, wherein.

DETAILED DESCRIPTION

Figure 1:
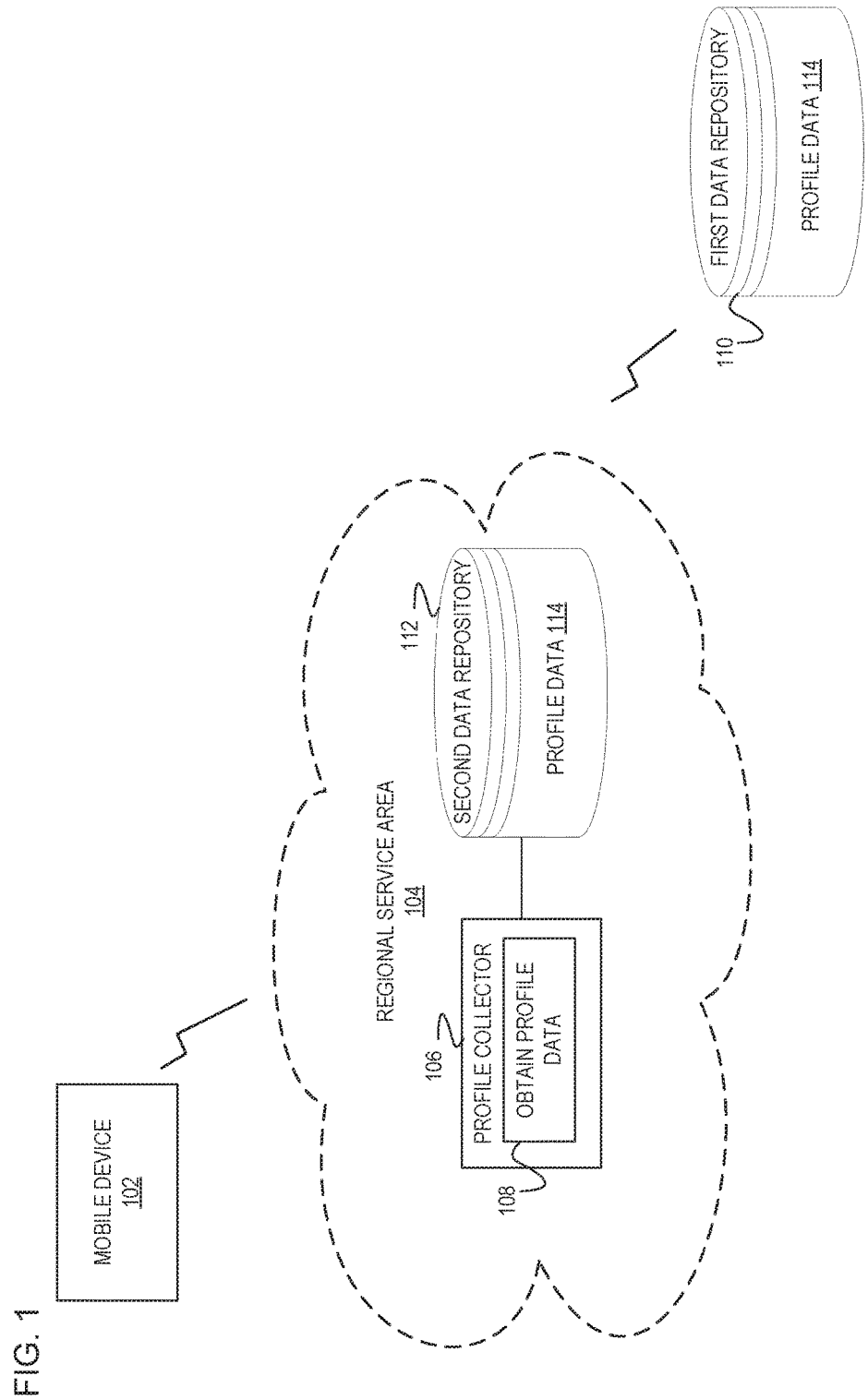
FIG. 1 is a block diagram of an example communications system including a regional service area to obtain profile data corresponding to a mobile from a first data repository and stored in a second data repository local to the regional service area in accordance with the present disclosure.

Profile data corresponding to each mobile device may be accessed by service applications to authenticate, attach, and register that mobile device within a CSP domain to provide communication services.

Mobile network operators (MNOs) have two different options on how network and service application access a subscriber's profile data. The first option tethers the profile data to a permanent location. In this option, applications utilize some form of deterministic routing to find the permanent location of the profile data. The MNO manages and maintains extensive network routing tables for each subscriber profile data in each of the various types of networks (e.g., 2G, 3G, 4G, 5G, IP Multimedia system, etc.) Network traffic is routed to the permanent location where the subscriber profile data resides; however, this option increases network traffic and latency. For example, the CSP may service millions of subscribers while a single subscriber operating in the IP Multimedia System (IMS) network may generate around 32 query/update messages in an hour. This example increases network traffic and latency to complete a profile routing lookup and increases network backhaul routing to access the profile data for each subscriber.

The second option replicates the subscriber profile data across regional data centers so local networks and applications can access each profile. This second option reduces network traffic and latency; however, this option also increases costs in storage, increases network bandwidth, and increases machine resources to provide the replication. Additionally, this second option increases profile data inconsistencies and data integrity due to synchronization issues across the regional data centers.

Accordingly, the present disclosure provides a mechanism that decreases network traffic, latency, storage, and network bandwidth by increasing the mobility of a subscriber's profile data. Based on a subscriber entering a new region, the profile data specific to that subscriber is collected from either a central profile data repository or the last known region. The collected profile data is stored in a data repository local to the new region. Storing the profile data in a local data repository, local networks and applications may directly access the local data repository to authenticate, register, and attach a mobile device. Directly accessing a local profile data decreases network traffic and latency. Additionally, storing the profile data in the local data repository removes the aforementioned synchronicity issues among the regional data centers.

For example, while the mobile device remains within the new regional service, service applications and networking components perform network access functions for authentication and registrations of requests for voice and/or data services. As such, the service applications and networking applications access the locally cached profile data which reduces the aforementioned storage, latency, and network traffic, and synchronicity issues.

The following detailed description refers to the accompanied figures. Wherever possible, the same reference numbers are used in the figures and the following description to refer to the same or similar parts. It is to be expressly understood, however, that the figures are for the purpose of illustration and description only. While several examples are described throughout, modification, adaptions, and other implementations are possible. Accordingly, the following detailed description is not meant to limit the disclosed examples, rather it is meant to provide proper scope of the disclosed examples and may be defined by the appended claims.

FIG. 1 illustrates an example communications system including mobile device 102 and regional service area 104. Based on mobile device 102 entering or relocating to regional service area 104, profile collector 106 obtains profile data 114 corresponding to mobile device 102 at module 108 from first data repository 110. First data repository 110 is positioned in a remote location to regional service area 104 such that first data repository 110 is an external component to regional service area 104 and as such may also be referred to as the remote data repository. In response to obtaining profile data 114, profile collector 106 proceeds to store profile data 114 in second data repository 112. Second data repository 112 is local or included within the regional service area 104 and as such may also be referred to as the local data repository.

The communications system in FIG. 1 represents a wireless mobile telecommunications system to provide network access, data services, and/or voice services for mobile device 102. Implementations of the communication system include at least one or combination of 2G, 3G, 4G, 5G, Long Term Evolution (LTE) network, Software Defined Network (SDN), Internet Protocol Multimedia System (IMS), virtual network, Evolved Packet System (EPS), Global System for Mobile Communications (GSM), or other type of communications system capable of providing network access, data services, and voice services to a group of subscribers and/or mobile devices. Although FIG. 1 illustrates the communications system as including mobile device 102, regional service area 104, and first data repository 110, implementations should not be limited as the communications system may also include additional regional service areas, switch, data center, router, wireless access point, base station, etc.

Mobile device 102 is a portable computing device, such as a smartphone or tablet which requests network access via regional service area 104. Mobile device 102 provides network access, data communications, and voice communications to the subscriber (not illustrated). Mobile device 102 transmits a request to regional service area 104 for network access. Upon receiving the request, profile collector 106 obtains profile data 114 form first data repository 110 at module 108.

Regional service area 104 is defined by an MNO as a regional area or a group of subscribers/mobile devices with boundaries defined by the MNO. Regional service area 104 is represented with dashed line as this may be defined by the MNO. Regional service area 104 is the edge locality where network access and service processing for mobile device 102 is performed within an evolved packet core (EPC) software defined network. Regional service area 104 may be defined by a MNO as a network slice of common subscribers and/or mobile devices. The network slice represents a group of subscribers and/or mobile devices which are serviced. In other implementations, regional service area 104 is organized as a geographical region serviced from a regional data center. This regional data center may utilize EPC software defined network to service those subscribers and/or mobile devices within that defined region. As such, the regional service area 104 may be geographically defined and/or subscriber/mobile device defined. Although FIG. 1 illustrates regional service area 104 with profile collector 106 and second data repository 112, implementations should not be limited as regional service area 104 may also include a controller to manage network access and telecommunication services to mobile device 102. In implementations, regional service area 104 may include at least one or combination of the following network devices to attach mobile device 102: a general packet radio service support nodie (SGSN) in which to attach mobile device 102 to a 3GPP domain, such as 2G or 3G network; mobile management entity (MME) to attach to a 3GPP access domain, such as 4G or LTE network; and enhanced packet data gateway (EPDG) to attach to a non-3GPP access domain, such as wireless local area network (WLAN). In these implementations, profile collector 106 works in conjunction with at least one of the aforementioned networking components. The particular networking component may communicate with a home subscriber server (HSS) to collect profile data 114 from first data repository 110. This implementation may be discussed in detail in later figures.

Profile collector 106 identifies when mobile device 102 has entered regional service area 104 and proceeds to obtain profile data 114 from first data repository 110 at module 108. Implementations of profile collector 106 may include, by way of example, hardware such as a network switch, router, or other type of networking component capable of collecting profile data 114 from first data repository 110. Alternatively, or in addition, profile collector 106 may include a software defined component, such as instructions (e.g., stored on a machine-readable medium) that, when executed (e.g., by the controller), implement the capability of collecting profile data 114 from first data repository 110.

At module 108, profile collector 106 obtains profile data 114 from first data repository 110. Profile collector 106 may work in conjunction with the networking device associated with a type of network. Implementations of module 108 may include, by way of example, instructions (e.g., stored on a machine-readable medium) that, when executed (e.g., by the controller), implement the functionality of module 108. Alternatively, or in addition, module 108 may include electronic circuitry (i.e., hardware) that implements the functionality of module 108.

First data repository 110 is a user data repository located externally to regional service area 104. As such, first data repository 110 is considered in a remote location to the regional service area 104. In one implementation, first data repository 110 is a centralized data repository in which multiple service regions may access to obtain profile data. In another implementation, first data repository 110 is another user data repository located in the last known regional service area in which mobile device 102 attached. For example, when mobile device 102 enters a new regional service area, profile collector 106 retrieves profile data 114 from the last known regional service area and caches profile data 114 in the local data repository 112. While mobile device 102 is located within regional service area 104 and performs network access functions for authentication and registration of requests voice or data services, network access and service applications access the locally cached profile data. In other implementations of first data repository 110 include data storage, cache, data partition, memory, or other type of data repository capable of maintaining a list of subscribers and/or mobile devices with the corresponding profile data information.

Second data repository 112 is the user data repository located locally to regional service area 104. Second data repository 112 includes profiles for the corresponding mobile devices that are located throughout service regional area 104. Obtaining profile data 114 and caching those mobile devices located in service regional area 104 reduces the number of profiles and therefore storage within second data repository 112. Additionally, caching profile data 114 locally on second data repository 112, reduces the latency for network functions to access profile data 114. Implementations of second data repository 112 include data storage, cache, data partition, memory, or other type of data repository capable of maintaining a list of subscribers and/or mobile devices with the corresponding profile data information located within regional service area 104.

Figure 2:
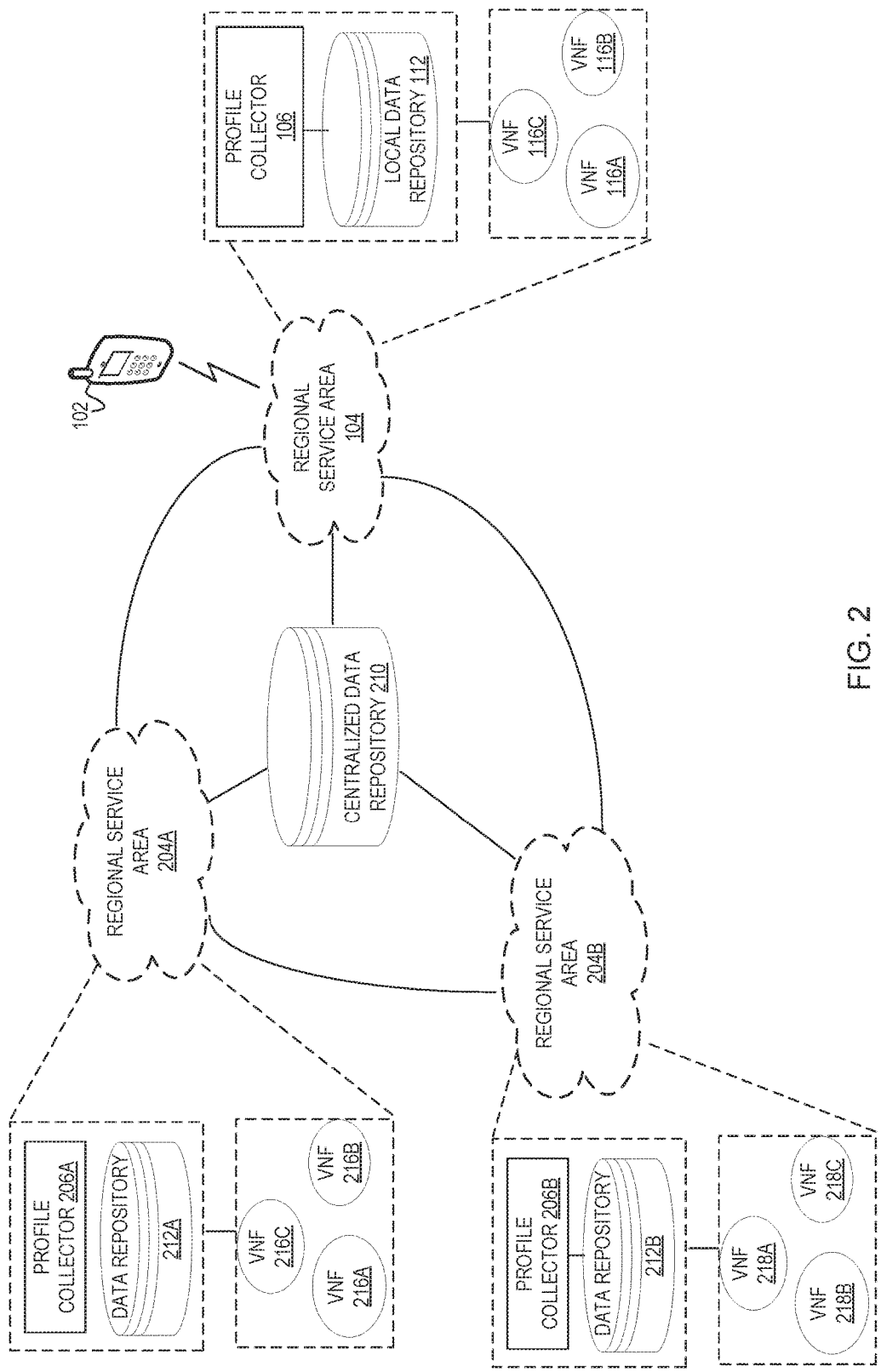
FIG. 2 is a diagram of an example communications system including a regional service area to obtain a profile data corresponding to a mobile device from a last known regional service area or a centralized data repository in accordance with the present disclosure.

FIG. 2 illustrates a communications system to assist wireless device 102 by increasing mobility of a profile data corresponding to wireless device 102. The communications system includes various regional service areas 104, 204A, and 204B. Each regional service area 104, 204A, and 204B includes its own respective profile collector 106, 206A, and 206B and data repository 112, 212A, and 212B. Data repositories 112, 212A, and 212B are considered local to the respective regional service area 104, 204A, and 204 but in a remote location to the other regional service areas. For example consider the following: data repository 212A is local to regional service area 204A but remotely located to regional service area 204B and 104; data repository 212B is local to regional service area 204B but remotely located to regional service area 204A and 104; data repository 112 is local to regional service area 104 but remotely located to regional service area 204A and 204B. Profile collectors 106, 206A, and 206 each build and add profile data to the corresponding data repository 112, 212A, and 212B based on mobile device 102 entering that particular regional service area 104, 204A, or 204B. As illustrated in FIG. 2, based on mobile device 102 entering regional service area 104 from one of the other regional service areas 204A or 204B, profile collector 106 obtains the profile data corresponding to that mobile device 102 and caches within local data repository 112 for quicker access to the applications and components in regional service area 104. For clarification and not for purposes of limiting implementations, FIG. 2 is illustrated from the perspective of regional service area 104 and corresponding components 106, 112, and 116A-116C.

Additionally, each regional service area 104, 204A and 204B includes a set of virtualized network functions 116A-116C, 216A-216C, and 218A-218C, respectively. These virtualized network functions virtualized network functions 116A-116C, 216A-216C, and 218A-218C represents network architecture that are virtualized network node functions to connect and/or create communication services. For clarification purposes and not for limitations purposes, the discussion over the virtualized network functions will be focused on the virtualized network functions 116A-116C associated with regional service area 104. In one implementation, each virtualized network functions 116A, 116B, or 116C include a service application or network application that would be implemented by a networking component to authenticate, register, and attach mobile device 102 to regional service area 104. For example, 116A-116C may be implemented to provide the functionality of networking components, such as an MME, SGSN, EPDG, HSS, or AAA server. In this implementation these virtualized network functions 116A-116C include instructions executable by a hardware component (e.g., processor, controller, etc.) within communications system to provide the functionality of networking components MME, SGSN, EPDG, HSS, and AAA server. These virtualized networking components operate in conjunction with one another to authenticate, register, and attach mobile device 102. In this implementation, upon mobile device 102 entering regional service area 104, the MME virtualized network function operates with the HSS virtualized network function and profile collector 106 to obtain profile data.

Depending on regional service area 104, 204A, 204B that mobile device 102 is present within, the respective profile collector 106, 206A, or 206B collects the profile data from either centralized data repository 210 or from the respective data repository 112, 212A, or 212B in which mobile device 102 was previously attached to. For example, assume mobile device 102 was previously attached or services within regional service area 204A. This means the profile data was cached in data repository 212A. Mobile device 102 may enter new regional service area 104 by requesting network access and/or communication services from regional service area 104. As such, profile collector 106 communicates with the last known regional service area 204A to obtain the profile data from data repository 212A. Profile collector 106 proceeds to cache profile data in local data repository 112. In another example, based on mobile device 102 entering regional service area 104, profile collector 106 reaches out to centralized data repository 210 to collect the profile data for that mobile device 102. Keeping in line the previous example, profile collector 106 obtains the profile data and caches at local data repository 112. While mobile device 102 remains within regional service area 104, virtualized network functions 116A-116C perform the authentication, registration, and/or attachment of mobile device 102. These network functions 116A-116C access the locally cached profile data in local data repository 112 to grant network access, voice, and/or data communications to mobile device 102.

Figure 3:
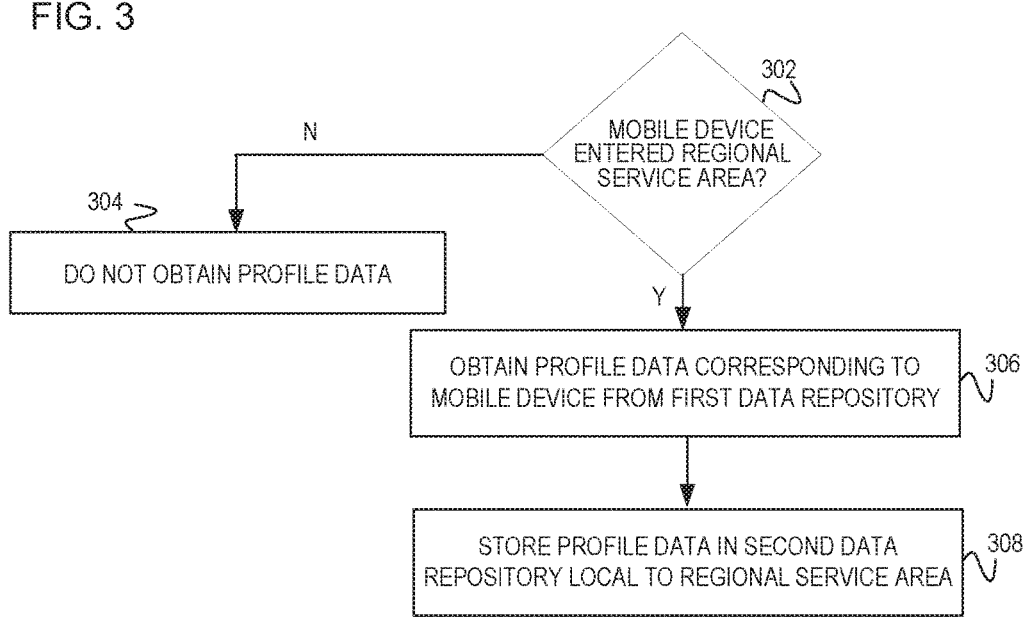
FIG. 3 is a flowchart of an example method to obtain profile data from a first data repository remote to a regional service area to a second data repository local to the regional service area in accordance with the present disclosure.
Figure 4:
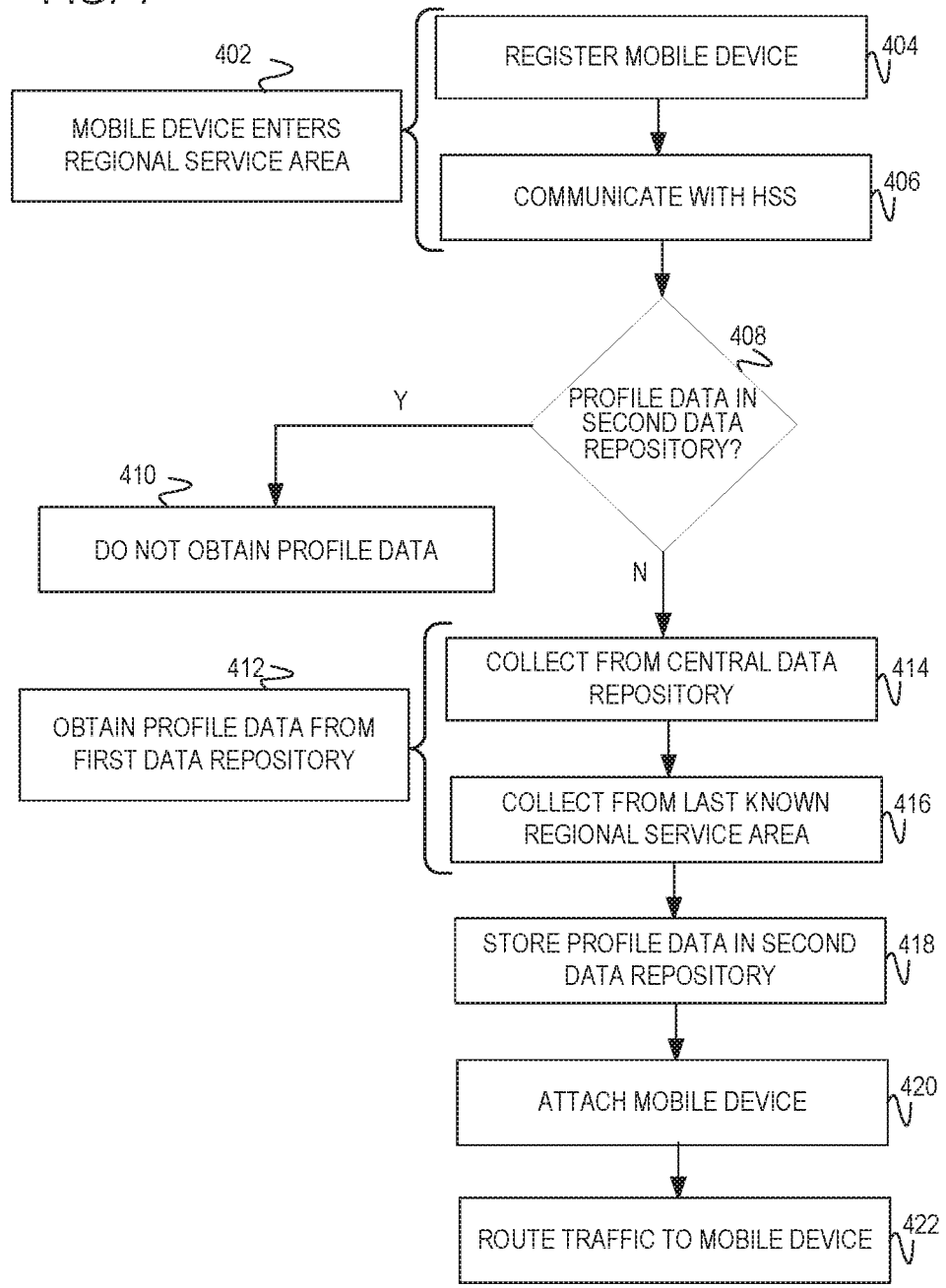
FIG. 4 is a flowchart of example method to obtain profile data corresponding to a mobile device in response to the mobile device entering a regional service area and storing the profile data in a data repository local to the regional service area in accordance with the present disclosure.

Referring now to FIGS. 3-4, example flowcharts are illustrated in accordance with various examples of the present disclosure. The flowcharts represent processes that may be utilized in conjunction with various systems and devices as discussed with reference to the preceding figures. While illustrated in a particular order, the flowcharts are not intended to be so limited. Rather, it is expressly contemplated that various processes may occur in different orders and/or simultaneously with other processes than those illustrated.

FIG. 3 illustrates a method, executable by a networking component, to store profile data corresponding to a mobile device from a remote data repository to a local data repository. The networking component identifies when the mobile device enters a regional service area through monitoring the mobile device request to network access. Based on the mobile device entering the regional service area, the networking component proceeds to obtain the profile data corresponding to the mobile device from a first data repository. The first data repository is located remotely to the regional service area and as such may also be referred to as the remote data repository. Upon obtaining the profile data, the networking component stores the profile data in a second data repository. The second data repository is local to the regional service area and as such may also be referred to as the local data repository. In discussing FIG. 3, references may be made to the components in FIG. 1 to provide contextual examples. In one implementation, profile collector 106 as in FIG. 1 executes operations 302-308 to obtain a profile data from a first data repository and store in a second data repository local to a regional service area. Although FIG. 3 is described as implemented by profile collector 106, it may be executable on other suitable hardware components. For example, FIG. 3 may be implemented in the form of executable instructions on a machine-readable storage medium 504 and 604 as in FIGS. 5-6.

At operation 302, the networking component monitors the regional service area to identify when mobile device(s) enters the regional service area. Upon entering the regional service area, the mobile device requests network access via contact to the networking component. The request includes information such as the identification of the mobile device and serves as notification to the networking component the mobile device has entered the regional service area. Upon identifying the mobile device has entered the regional service area, the networking component may proceed to obtain the profile data from the remote data repository as at operation 306. In another implementation, if the mobile device has refrained from entering the regional service area, the networking component may continue to monitor the regional service area. In this implementation, the networking component proceeds to operation 304 and does not obtain the profile data.

At operation 304 based on the mobile device not entering regional service area, the networking component does not obtain profile data. Alternatively, this indicates to the networking component the mobile device has not requested network access and as such may be offline or unresponsive within the regional service area.

At operation 306, the networking component proceeds to obtain the profile data from the first data repository. The first data repository is located in a remote position from the regional service area such that repository separated by a distance from the regional service area. In one implementation, the networking component retrieves the profile data from a central data repository. The central data repository is a centralized repository that maintains a list of subscribers, mobile devices, and the corresponding profiles. This centralized repository is accessible across various regional service areas such that when a mobile device enters any of the regional service areas, the respective networking component in that regional service area retrieves the profile data from the centralized repository. In another implementation the networking component, obtains the profile data from a last known regional service area in which the mobile device was attached. In this implementation, upon the mobile device entering the new regional service area, the networking component communicates with the last known regional service area to obtain the profile data. These implementations are discussed in detail in later figures.

At operation 308, the networking component stores the profile data in the second data repository local to the regional service area (e.g., local data repository). Based on the mobile device remaining within the regional service area and performing network access functions, data request, and/or voice requests, the components and applications within the regional service area use the locally stored profile data. In a further implementation, network traffic is configured to route from the last known regional service area to the new regional service area in which the mobile device is located.

FIG. 4 illustrates a method, executable by a networking component, to collect profile data from a central data repository or from a last known regional service area and store the profile data in a local data repository. In discussing FIG. 4, references may be made to the components in FIG. 1 to provide contextual examples. In one implementation, profile collector 106 as in FIG. 1 executes operations 402-422 to obtain a profile data from a first data repository and store in a second data repository local to a regional service area. Although FIG. 4 is described as implemented by profile collector 106, it may be executable on other suitable hardware components. For example, FIG. 4 may be implemented in the form of executable instructions on a machine-readable storage medium 504 and 604 as in FIGS. 5-6.

At operation 402, the mobile device enters the regional service area. The networking component may identify the mobile device has entered the regional service area when the mobile device attempts network access. Operation 402 may be similar in functionality to operation 302 as in FIG. 3. In an implementation, upon the mobile device entering the regional service area, the networking component may proceed to operations 404-406. In this implementation, upon the mobile device entering the regional service area, the mobile device registers with a networking component that corresponds to the domain of the regional service area as at operation 404. As such, the networking component proceeds to communicate with a home subscriber server (HSS) to determine whether the profile data corresponding to the mobile device is already in the data repository local to the regional service area as at operation 406.

At operation 404, the virtualized network functions, which virtualize the networking component, such as SGSN, MME, AAA, EPDG. At least one of these components operate in conjunction with an HSS to register the mobile device within the regional service area.

At operation 406, the service application communicate with the HSS to determine whether the profile data has already been cached in the second data repository as at operation 408. In response to the determination that the profile data has not yet been cached in the second data repository, the HSS works in conjunction with the networking component to collect the profile data from the first data repository.

At operation 408 in response to the determination that the profile data is not within the second data repository, the networking component proceeds to collect the profile data from the first data repository remote to the regional service area. In one implementation, the networking component may proceed to collect the profile data from a central data repository. In another implementation, the networking component may proceed to collect the profile data from the last known regional service area in which the mobile device was attached.

At operation 410, the networking component does not obtain the profile data. Alternatively, this means the profile data is already in the second data repository and as such may it may be unnecessary to collect the profile data.

At operation 412, the networking component proceeds to obtain profile data from the first data repository. The first data repository is the repository that is in a remote location to the regional service area. As such, the networking component may collect profile data from a central data repository or from the last known regional service area in which the mobile device was attached as at operations 414-416. In these implementation, the networking component may proceed to operation 414 or 416. Operation 412 may be similar in functionality to operation 306 as in FIG. 3.

At operation 414, the networking component collects the profile data from the central data repository. The central data repository includes the data repository that is accessible to multiple regional service areas. In this manner, each regional service area may retrieve the profile data related to a mobile device from the central data repository upon the mobile device entering the service area.

At operation 416, the networking component collects the profile data from the last known regional service area. In this implementation, upon the mobile device entering the regional service area, one of the virtualized network functions, such as the MME, SGSN, or EPDG communicates with the HSS to identify which regional service area last serviced the mobile device. Upon identifying the last known regional service area, the networking component reaches out to that regional service area to obtain the profile data.

At operation 418 based on obtaining the profile data, the networking component proceeds to store the profile data in the local data repository. Operation 418 may be similar in functionality to operation 308 as in FIG. 3.

At operation 420 mobile device is attached to the regional service area for network access, data communications, and/or voice communications. In one implementation, the mobile device is attached to the regional service area as at operation 422.

At operation 422 network traffic is routed from the last known regional service area to the mobile device in the regional service area with the localized cached profile data. In this implementation, the networking component may communicate with the last known regional service area to identify where to route incoming network traffic in response to the profile data having been locally cached.

Figure 5:
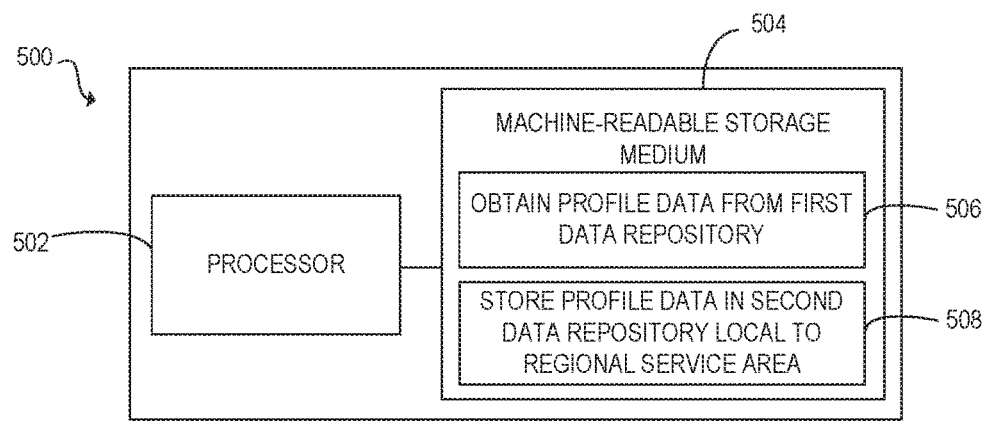
FIG. 5 is a block diagram of an example networking device with a processing resource to execute instructions in a machine-readable storage medium for storing profile data corresponding to a mobile device from a first data repository to a second data repository in accordance with the present disclosure.
Figure 6:
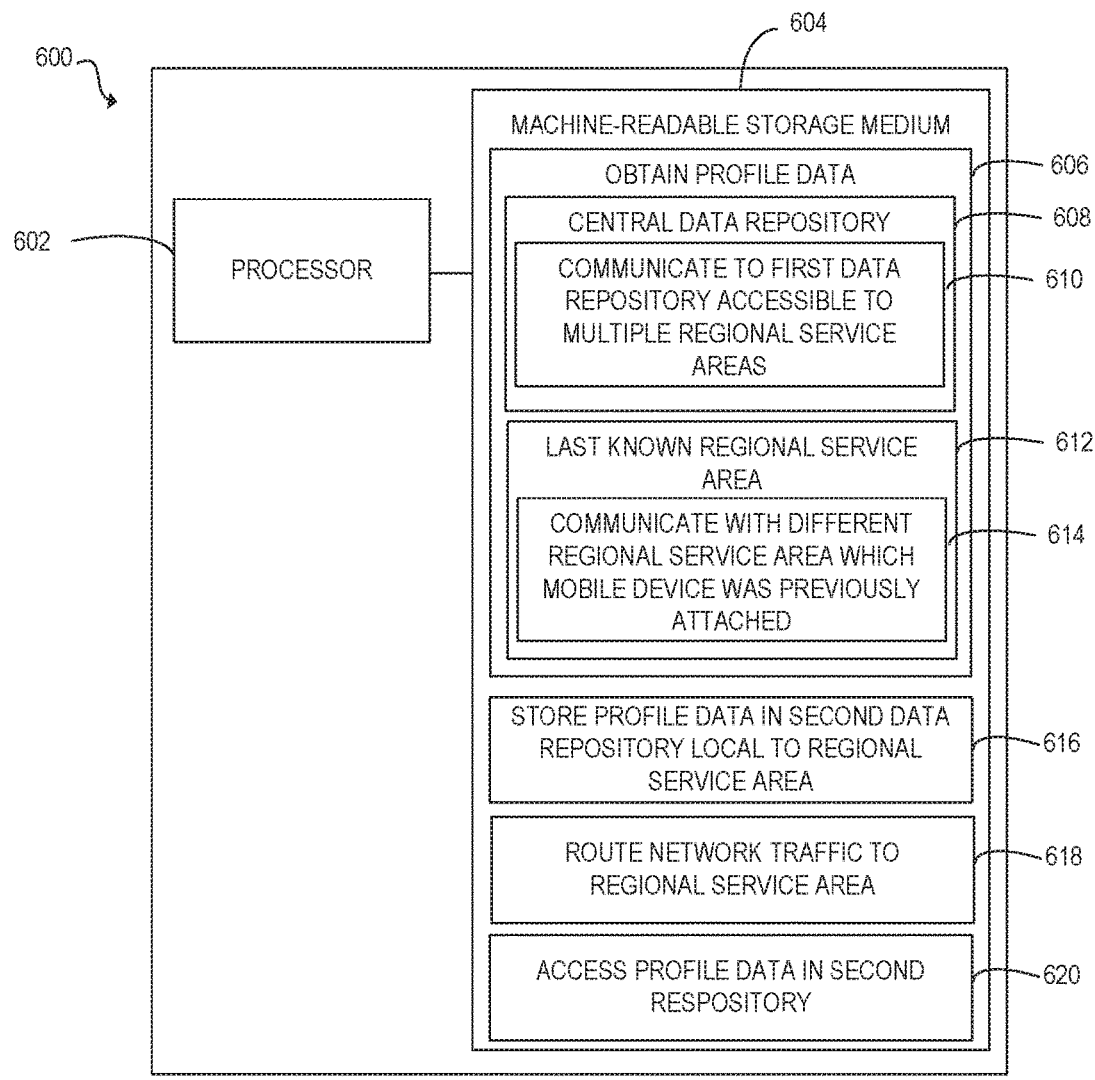
FIG. 6 is a block diagram of an example networking device with a processing resource to execute instructions in a machine-readable storage medium for storing a data profile corresponding to a mobile device to a data repository local to a regional service area from a central data repository or a last known regional service area to which the mobile device was previously attached in accordance with the present disclosure.

Referring now to FIGS. 5-6, example block diagrams of networking devices 500 and 600 with processing resources 502 and 602 are illustrated to execute machine-readable instructions in accordance with various examples of the present disclosure. The machine-readable instructions represent instructions that may be fetched, decoded, and/or executed by respective processing resources 502 and 602. While illustrated in a particular order, these instructions are not intended to be so limited. Rather, it is expressly contemplated that various instructions may occur in different orders and/or simultaneously with other instructions than those illustrated in FIGS. 5-6.

FIG. 5 is a block diagram of networking device 500 with processing resource 502 to execute instructions 506-508 within a machine-readable storage medium 504. Although the networking device 500 includes processing resource 502 and machine-readable storage medium 504, it may also include other components that would be suitable to one skilled in the art. For example, the networking device 500 may include a controller, memory storage, or other suitable type of component. The networking device 500 is an electronic device with the processing resource 502 capable of executing instructions 506-508 and as such embodiments of the networking device 500 include a server, switch, router, wireless access point (WAP), computing device, or other type of electronic device capable of executing instructions 506-508. The instructions 506-508 may be implemented as methods, functions, operations, and other processes implemented as machine-readable instructions stored on the storage medium 504, which may be non-transitory, such as hardware storage devices (e.g., random access memory (RAM), read only memory (ROM), erasable programmable ROM, electrically erasable ROM, hard drives, and flash memory).

The processing resource 502 may fetch, decode, and execute instructions 506-508 to obtain a profile data from a first data repository in response to a mobile device entering a service regional area and storing the profile data in the second data repository local to the service regional area. Specifically, the processing resource 502 executes instructions 506-508 to: obtain profile data corresponding to a mobile device from the first data repository in response to the mobile device entering the regional service area; and storing the profile data in the second data repository local to the regional service area.

The machine-readable storage medium 504 includes instructions 506-508 for the processing resource 502 to fetch, decode, and execute. In another embodiment, the machine-readable storage medium 504 may be an electronic, magnetic, optical, memory, storage, flash-drive, or other physical device that contains or stores executable instructions. Thus, the machine-readable storage medium 504 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 504 may include an application and/or firmware which can be utilized independently and/or in conjunction with the processing resource 502 to fetch, decode, and/or execute instructions of the machine-readable storage medium 504. The application and/or firmware may be stored on the machine-readable storage medium 504 and/or stored on another location of the networking device 500.

FIG. 6 is a block diagram of networking device 600 with processing resource 602 to execute instructions 606-620 within a machine-readable storage medium 604. Although the networking device 600 includes processing resource 602 and machine-readable storage medium 604, it may also include other components that would be suitable to one skilled in the art. For example, the networking device 600 may include a controller, memory storage, or other suitable type of component. The networking device 600 is an electronic device with the processing resource 602 capable of executing instructions 606-620 and as such embodiments of the networking device 600 include a server, switch, router, wireless access point (WAP), computing device, or other type of electronic device capable of executing instructions 606-620. The instructions 606-620 may be implemented as methods, functions, operations, and other processes implemented as machine-readable instructions stored on the storage medium 604, which may be non-transitory, such as hardware storage devices (e.g., random access memory (RAM), read only memory (ROM), erasable programmable ROM, electrically erasable ROM, hard drives, and flash memory).

The processing resource 602 may fetch, decode, and execute instructions 606-620 to obtain profile data corresponding to a mobile device from a central data repository or last known regional service area. In response, the profile data is stored in the data repository local to the regional service area. Specifically, the processing resource 602 executes instructions 606-620 to: in response to the mobile device entering the regional service area, obtaining the profile data from the central data repository or the last known regional service area as at instructions 608-610 or 612-614; to obtain the profile data from the central data repository, communicate to the first data repository which is accessible by multiple regional service areas, to obtain the profile data from the last known regional area in which the mobile device was previously attached, communicate with a different regional service area; in response to collecting the profile data, store the profile data in the second data repository local the newly entered regional service area, route network traffic from the previously attached regional service area to the regional service area which is currently serving the mobile device and storing the profile data in its local data repository; and access the profile data in the second data repository to grant the mobile device network access.

The machine-readable storage medium 604 includes instructions 606-620 for the processing resource 602 to fetch, decode, and execute. In another embodiment, the machine-readable storage medium 604 may be an electronic, magnetic, optical, memory, storage, flash-drive, or other physical device that contains or stores executable instructions. Thus, the machine-readable storage medium 604 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 604 may include an application and/or firmware which can be utilized independently and/or in conjunction with the processing resource 602 to fetch, decode, and/or execute instructions of the machine-readable storage medium 604. The application and/or firmware may be stored on the machine-readable storage medium 604 and/or stored on another location of the networking device 600.

Although certain embodiments have been illustrated and described herein, it will be greatly appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a variety of ways. This application is intended to cover adaptions or variations of the embodiments discussed herein. Therefore, it is manifestly intended that embodiments be limited only by the claims and equivalents thereof.

We claim:

1. A method comprising:
   determining that a mobile device is local to a regional service area, via the mobile device registering with a first networking component that corresponds to a domain of the regional service area, and the first networking component communicating with a first home subscriber server (HSS) of the regional service area;
   in response to the determination that the mobile device is local to the regional service area, retrieving a profile data corresponding to the mobile device from a first data repository;
   storing the profile data corresponding to the mobile device in a second data repository cache that is local to the regional service area and stores profile data in the cache only for mobile devices within the regional service area; and
   in response to the mobile device entering a different regional service area, collecting the profile data from a last known regional service area of the mobile device,
   wherein the last known regional service area is determined by a virtualized network function of the different regional service area communicating with a second HSS of the different regional service area, and wherein the profile data is collected from the last known regional service area by a second networking component of the different regional service area communicating with the last known regional service area to obtain the profile data.

2. The method of claim 1, wherein the regional service area is defined by a mobile network operator (MNO).

3. The method of claim 1, further comprising routing network traffic from a previously attached regional service area to the regional service area currently serving the mobile device.

4. The method of claim 1, wherein retrieving the profile data corresponding to the mobile device from the first data repository includes collecting the profile data from a data repository accessible by multiple regional service areas.

5. The method of claim 1, wherein retrieving the profile data corresponding to the mobile device from the first data repository includes collecting the profile data from a different regional service area which the mobile device was previously attached.

6. The method of claim 1, further comprising attaching the mobile device to the regional service area via access to the profile data in the second data repository local to the regional service area.

7. The method of claim 1, further comprising replicating the profile data in the second data repository to another regional service area redundant to the regional service area defined by the mobile network operation.

8. The method of claim 1, wherein retrieving the profile data corresponding to the mobile device from the first data repository comprises:
   registering the mobile device in response to the determination that the mobile device has entered the regional service area; and
   determining if the profile data is in the second data repository, wherein determining if the profile data is in the second data repository includes querying a home subscriber server (HSS).

9. The method of claim 8, further comprising:
   transmitting a communication to obtain the profile data from the first data repository in response to a determination that the profile data is absent from the second data repository; and
   accessing the profile data to perform network access functions associated with the mobile device in response to a determination that the profile data is located within the second data repository.

10. A system comprising:
    a regional service area defined by a mobile network operator (MNO);
    a first data repository remote to the regional service area, wherein the first data repository includes a profile data corresponding to a mobile device;
    a second data repository local to the regional service area; and
    a profile collector to:
      in response to a determination that the mobile device is local to the regional service area, obtain the profile data corresponding to the mobile device from the first data repository, wherein that the mobile device is local to the regional service area is determined via the mobile device registering with a first networking component that corresponds to a domain of the regional service area, and the first networking component communicating with a first home subscriber server (HSS) of the regional service area;
      store the profile data in a second data repository cache that is local to the regional service area and stores profile data in the cache only for mobile devices within the regional service area; and
      in response to entrance of the mobile device into a different regional service area, collect the profile data from a last known regional service area of the mobile device,
    wherein the last known regional service area is determined by a virtualized network function of the different regional service area communicating with a second HSS of the different regional service area, and wherein the profile data is collected from the last known regional service area by a second networking component of the different regional service area communicating with the last known regional service area to obtain the profile data.

11. The system of claim 10, further comprising the first data repository to transmit the profile data to the regional service area.

12. The system of claim 11, wherein to obtain the profile data corresponding to the mobile device from the first data repository the profile collector is to obtain the profile data from a different regional service area which the mobile device was previously attached.

13. The system of claim 11 wherein to obtain the profile data corresponding to the mobile device from the first data repository the profile collector is to obtain the profile data from a central data repository.

14. The system of claim 10, further comprising a networking component, local to the regional service area, to register the mobile device to the regional service area based on the mobile device entering the regional service are.

15. The system of claim 14, further comprising a home subscriber server (HSS), in communication with the networking component and local to the regional service area, to determine if the profile data is within the second data repository.

16. A non-transitory machine-readable storage medium comprising instructions executable by a processing resource to:
- determine that a mobile device is local to a regional service area, via the mobile device registering with a first networking component that corresponds to a domain of the regional service area, and the first networking component communicating with a first home subscriber server (HSS) of the regional service area, wherein the regional service area is defined by a mobile network operation (MNO);
- in response to the determination that the mobile device is local to the regional service area, obtain a profile data corresponding to the mobile device from a first data repository that is a central data repository;
- store the profile data in a second data repository cache that is local to the regional service area and stores profile data in the cache only for mobile devices within the regional service area; and
- in response to the mobile device entering a different regional service area, collect the profile data of the mobile device from a last known regional service area of the mobile device,
- wherein the last known regional service area is determined by a virtualized network function of the different regional service area communicating with a second HSS of the different regional service area, and wherein the profile data is collected from the last known regional service area by a second networking component of the different regional service area communicating with the last known regional service area to obtain the profile data.

17. The non-transitory machine-readable storage medium of claim 16, further comprising instructions executable by the processing resource cause the networking device route network traffic from a previously attached regional service area to the regional service area currently serving the mobile device based on the profile data in the second data repository.

18. The non-transitory machine-readable storage medium of claim 16 wherein the instructions to obtain the profile data corresponding to the mobile device from the first data repository include instructions to:
- communicate with a different regional service area which the mobile device was previously attached; and
- based on the communication with the different regional service area, obtain the profile data from the different regional service area.

19. The non-transitory machine-readable storage medium of claim 16 wherein the instructions to obtain the profile data corresponding to the mobile device from the first data repository include instructions to communicate with the first data repository that is accessible to multiple regional service areas to obtain the profile data.

20. The non-transitory machine-readable storage medium of claim 16, further comprising instructions executable by the processing resource to access the profile data in the second data repository in response to a service request from the mobile device.

* * * * *